Patented May 14, 1946

2,400,129

UNITED STATES PATENT OFFICE 2,400,129

SOLUTION POLYMERIZATION PROCESS

Joseph F. Nelson, Elizabeth, and Augustus B. Small, Roselle, N. J., assignors to Standard Oil Development Company, a corporation of Delaware No Drawing. Application June 6, 1942, Serial No. 446,052

11 Claims. (Cl. 260—93)

This invention relates to the polymerization of olefinic substances; relates particularly to the polymerization of olefinic materials, including iso-olefins and diolefins, by the application thereto of Friedel-Crafts' catalysts; and relates especially to the polymerization of olefinic materials in the presence of a diluent-solvent for the polymer.

It has been found possible to prepare high molecular weight polymers, which are rubbery in type and capable of a high extension upon the application of tension with a forcible retraction to original size and shape upon release of tension; by a low temperature polymerization reaction, catalyzed by a Friedel-Crafts type of catalyst. These polymers are prepared from iso-olefinic substances such as isobutylene, mixed with diolefins such as butadiene, isoprene, pentadiene, dimethyl butadiene and the like, substantially any of the diolefins from 4 to 10 or 12 or even higher carbon atoms per molecule, whether conjugated or non-conjugated being useful. These polymers have molecular weights ranging from 1,000 up to 500,000 or even higher; and the mixed polymers of an iso-olefin with a diolefin, when they have molecular weights within the range of 15,000 or 20,000 to 250,000, are reactive with curing agents, such as sulfur or the organic polysulfides, or the oximes such as para-quinone dioxime and the like, to yield highly satisfactory synthetic rubbers having tensile strengths ranging from 1,500 to 4,500 pounds per square inch, elongations at break ranging from 500% to 1200%; and abrasion and flexure resistances conspicuously superior to those of natural rubber. These synthetic rubbers are highly resistant to oxidation and to the action of acids.

The polymerization of the olefinic mixtures has been conducted with the aid of refrigerants such as solid carbon dioxide or liquid ethylene or liquid ethane or liquid methane or even liquid propane, especially under reduced pressures and in the presence of diluents such as ethyl or methyl or propyl chloride, depending upon the lowness of temperature desired. This polymerization procedure yields the polymer in the form of a rubbery adhesive precipitate which tends to foul the equipment in which the polymerization is effected.

The product is a thick lumpy, sticky mass which is exceedingly difficult to purify and to handle in subsequent processes. Purification is desirable for the purpose of removing spent catalyst and low molecular weight polymers.

The present invention provides a polymerization reaction in which the polymerization is conducted at temperatures between —10° C. and —150° C. in the presence of a diluent which is inert with respect to both the catalyst and the olefins, and takes no part in the reaction, but has a high solvent power for the high molecular weight polymers. The preferred solvent for this purpose is carbon disulfide. Since the polymer remains in solution, fouling of the equipment is decreased; and the solution readily lends itself to operations involving the purification of the polymer.

Thus, the invention provides a polymerization procedure in which the low temperature polymerization is conducted entirely in solution to yield a solution of high molecular weight polymers. Other objects and details of the invention will be apparent from the following description:

In the cracking of petroleum to yield additional quantities of volatile fuel, about 15% of the crude oil which is cracked appears as gases, of which a substantial proportion is isobutylene and an additional small proportion is butadiene or other diolefins. It has been found possible to polymerize the isobutylene alone into a high molecular weight polymer, which is especial useful for thickening lubricating oils, by cooling the isobutylene to temperatures ranging from 0° C. to —100° C., or even lower, and treating the cooled material with a Friedel-Crafts catalyst, such as boron trifluoride. Also, if the isobutylene or other iso-olefin is mixed with a diolefin and cooled to similar low temperatures, an interpolymerization of the olefinic materials is obtainable by the application of a Friedel-Crafts catalyst, especially aluminum chloride dissolved in a non-complex forming low-freezing solvent, such as ethyl or methyl chloride or carbon disulfide. The reaction has been customarily conducted in the presence of an internal refrigerant, such as liquid ethylene or solid carbon dioxide or the like.

According to the present invention, the internal refrigerant is dispensed with, and the reaction is conducted in the presence of a low-freezing solvent-diluent, such as carbon disulfide which is a good solvent for the polymers. Alternatively, other homologues of carbon disulfide may be used; such as carbon diselenide, or carbon sulfoselenide, or carbon oxy-sulfide, or the like. The carbon disulfide diluent-solvent with a freezing point at —110° C. is particularly advantageous, since it is liquid over the preferred range of polymerization temperatures and has a high solubility for and miscibility with the liquefied olefins. The reaction occurs rapidly to yield the desired polymer which remains in solution, from which it may be recovered by volatilization of the carbon disulfide or by precipitation (which may be fractionally conducted, if desired) from the solution in carbon disulfide by the addition of oxygenated solvents, such as alcohol or ether or ketone or even organic acid; preceded, if desired, by a washing treatment with water, applied to the polymer solution, to remove all traces of the catalyst.

In conducting this reaction, the olefinic materials are preferably cooled to their liquefaction point and mixed with the diluent solvent, which is preferably carbon disulfide, in the proportion of 1 volume of the olefinic material with from 1 to 5 or 6 volumes of the diluent-solvent. This mixture is preferably cooled by an external refrigerant as shown in the copending application by Sparks and Thomas, Serial No. 444,738, filed May 27, 1942, and stirred vigorously, to cool it quickly to the temperature set by the refrigerant in the cooling jacket, and to promote to the utmost extent the heat transfer through the reactor wall to the cooling jacket. When a condition of adequate stirring is reached, the material is cooled to the desired temperature, and the catalyst is added.

This catalyst preferably is a solution of a Friedel-Crafts type catalyst, such as aluminum chloride in a non-reactive, low-freezing solvent, such as carbon disulfide, or one of the lower alkyl halides, such as ethyl, methyl or propyl chloride, or a more highly halogenated alkyl carbon. It may be noted that carbon tetrachloride or other fully halogenated alkyl solvent is less desirable for the polymerization reaction, since the presence of some other substituent than chlorine on the carbon atom appears to be desirable for the polymerization procedure. When carbon disulfide is used as the diluent-solvent, sufficient aluminum chloride is transferred from the catalyst solution to solution in the carbon disulfide solvent, to conduct the reaction satisfactorily. Aluminum chloride is the preferable catalyst, but a considerable range of other catalyst substances of the Friedel-Crafts type is available as pointed out by N. O. Calloway in his article on the Friedel-Crafts Synthesis in volume XVII, No. 3, page 327, of Chemical Reviews published for the American Chemical Society at Baltimore in 1935. The list of Friedel-Crafts type catalyst substances is particularly well shown on page 375. Any of the substances listed are more or less useful for this polymerization reaction, when dissolved in a low-freezing non-complex-forming solvent which is liquid at the polymerization temperature, or is soluble in the reaction mixture at the reaction temperature; the reaction being satisfactorily conducted even though the catalyst is carried into the reaction in a solvent which has a melting point above the reaction temperature, provided that the frozen catalyst solvent is soluble in the solvent diluent in which the reaction is conducted. This is particularly true of butyl chloride, which is an adequate solvent for the catalyst, especially when the catalyst solution is prepared at a temperature near to zero, to avoid reaction between the butyl chloride and the Friedel-Crafts type catalyst.

The reaction proceeds rapidly with a corresponding increase in the viscosity of the polymerization mixture, since the polymer remains in solution in the solvent diluent. The reaction may be carried to completion, particularly when isobutylene alone is polymerized providing sufficient $CS_2$ is present, or when the more readily co- polymerizing diolefins are used; these being especially isoprene and dimethyl butadiene. With the more difficultly copolymerizable diolefins, especially butadiene, the reaction is preferably halted when from 60% to 85% of the monoolefinic material present has polymerized, in order to avoid polymerization in the presence of an unduly high proportion of the diolefin. The polymerization process is readily halted merely by discontinuing the addition of catalyst, particularly when the catalyst is added in the form of a spray upon the surface of the rapidly stirred reaction mixture. To insure arrest of the polymerization reaction under such conditions, the reactant mix may be dumped from the reactor into rapidly stirred warm water. This procedure volatilizes quickly all of the olefinic reactants, and hydrolyzes the catalyst. If a large quantity of hot water is used, so that the ultimate temperature of the mixture is above the boiling point of the solvent diluent, such as carbon disulfide, the resulting product may be obtained essentially free of diluent. Alternatively, if the water is present in smaller volume or at lower temperature, so that the final temperature of the mixture is below the boiling point of the solvent diluent, which with carbon disulfide is approximately 46° C., the polymer remains in solution in the solvent diluent and is readily separated from the water solution of catalyst. The polymer may then be recovered from the solution either by precipitation; or by volatilization of the solvent. In either case, the recovery of the polymer may be conducted by a fractional separation, to distinguish between the higher molecular weight material which is desired, and any small quantities of low molecular weight polymer. If the separation is conducted by a fractional precipitation, successive small quantities of a precipitant, such as an alcohol, either monohydric or polyhydric, or an ether or a ketone or even an organic acid may be used. This procedure separates the high molecular weight polymers first and they may be removed from the solvent containing lower molecular weight polymers, and a further proportion of precipitant added to obtain medium molecular weight polymers, which may be removed, and a further portion of precipitant added to separate the relatively low molecular weight polymers. This procedure leaves behind in the solution any small quantities of extremely low polymer, that is, polymers having molecular weights below about 5,000, which may be recovered by the addition of a large excess of precipitant or preferably by volatilization of the solvent diluent and precipitant.

Alternatively, the high molecular weight polymers may be recovered by volatilization of the solvent diluent.

Whichever procedure for recovery of the polymer is used, the polymer is obtained in solid form, and is conveniently available for further processing, including compounding with sulfur or an organic polysulfide, such as tetramethyl thiuram, disulfide or both, or an oxime compound, such as paraquinone dioxime in the presence of an oxidizing agent, or other analogous curing agent. Appropriate filler substances may be added in addition, including such materials as stearic acid, zinc oxide, carbon black, cellulosic materials in almost any form, various other pigments, including clay, barites, chrome green, rouge, vermillion, and the like. The compounded polymer may then be formed into any desired shape and the curing completed by a heat treatment, which may be applied at temperatures ranging from 125° C. to 200° C. for time intervals ranging from 2 minutes to 2 hours.

Example 1

A mixture was prepared consisting of 343 parts by volume of liquid isobutylene and 7 parts by volume of isoprene, together with 700 parts of precooled carbon disulfide. This mixture was placed in a reactor having a liquid ethylene cooling jacket, bringing the mixture of olefins and solvent to a temperature of about −100° C. The cold mixture was then stirred vigorously and the catalyst added by spraying it in a fine mist onto the surface of the rapidly stirred mixture of olefins and diluent solvent. The catalyst consisted of a solution containing approximately 0.3% of aluminum chloride dissolved in methyl chloride. Approximately 50 parts by volume of the catalyst solution was sprayed into the olefinic mixture over a time interval of approximately 3 minutes. The polymerization reaction proceeded rapidly during the spraying of the catalyst, but the higher molecular weight polymer remained in solution in the carbon disulfide. When the catalyst had been added, the polymer solution was dumped into approximately 8,000 parts of hot water. The hot water volatilized the unreacted olefins and part of the carbon disulfide. The polymer was subjected to the action of a kneader containing boiling water for the purpose of removing the remaining carbon disulfide. The polymer was dried on a hot mill to yield a polymer having a molecular weight of approximately 56,000 (by the Staudinger viscosity method), and a mole percent of unsaturation of 0.87% (by the Wijs iodine method).

This material was then compounded with sulfur and various fillers according to the subjoined formula:

|  | Parts |
| --- | --- |
| Isobutylene-isoprene copolymer | 100 |
| Zince oxide | 5 |
| Stearic acid | 3 |
| Sulfur | 1.5 |
| Tuads (tetramethyl thiuram disulfide) | 1 |

This compound was prepared by working the polymer briefly on the mill, then adding the compounding ingredients, except the Tuads, and milling until they were well mixed in upon the hot mill. The mill was then cooled and the Tuads milled in quickly. The compounded polymer was then placed in molds and cured at a temperature of approximately 155° C. for a time interval of approximately 60 minutes. The cured polymer was found to have a tensile strength of approximately 1800 lbs. and an elongation at break of approximately 750%.

Example 2

A mixture was prepared consisting of 432 parts by volume of isobutylene with 18 parts by volume of isoprene with 900 parts by volume of pre-chilled carbon disulfide. This mixture was placed in the jacketed reactor and cooled by liquid ethylene in the cooling packet to a temperature of −100° C. The catalyst was then added as in Example 1 and the polymerization was then completed in the same way and the polymer solution dumped into hot water. The recovered polymer was found to have a molecular weight of 35,000 and a mole % of unsaturation of 1.76%. A yield of 36% of the original olefins was obtained.

The product was then compounded according to the above formula, placed in a mold and cured at a temperature of 307° F. (153° C.). Material cured for a time interval of 15 minutes at that temperature showed a tensile strength of 2580 lbs. per square inch, and material cured for 20 minutes at that temperature showed a tensile strength of 2380 lbs. per square inch.

Example 3

A mixture was prepared consisting of 300 parts by volume of isobutylene with 900 parts by volume of carbon disulfide. This mixture was placed in the reactor as above described and cooled to a temperature of approximately −100° C. To this mixture there was then added slowly, with rapid stirring, approximately 20 volumes of catalyst solution, consisting of methyl chloride containing .05% by weight of aluminum chloride; the addition being conducted over a time of about 3 minutes. At the end of this interval, the flow of catalyst was discontinued and the polymer solution dumped into hot water as in Example 1. The recovered polymer was found to have a molecular weight of approximately 140,000. This material, in common with simple polyisobutylene in general, does not react with sulfur.

Example 4

A mixture was prepared consisting of 300 parts by volume of isobutylene with 900 parts by volume of carbon disulfide. This mixture was placed in the reactor as above described and cooled to a temperature of approximately −100° C. A current of gaseous boron trifluoride was passed through the rapidly stirred mixture for a time interval of approximately 10 minutes. At the end of this interval, the catalyst was discontinued and the polymer solution dumped into hot water as in Example 1. The recovered polymer was found to have a molecular weight of approximately 140,000. This material, in common with simple polyisobutylene, in general, does not react with sulfur.

Example 5

A mixture was prepared consisting of 300 parts of styrene (monomer) with 900 parts of carbon disulfide. This mixture was placed in a jacketed reactor and cooled with liquid ethylene in the jacket to a temperature of approximately −103° C. The mixture was vigorously stirred and a catalyst was added consisting of a methyl chloride solution of aluminum chloride containing 0.2% of aluminum chloride. Approximately 600 parts of catalyst solution were added by delivery through a spray nozzle onto the surface of the rapidly stirred mixture. The polymerization reaction began promptly and proceeded smoothly to form the polystyrene. The polymer remained in solution at the temperature of polymerization. When the reaction was complete, the solution was allowed to warm up to room temperature. The polystyrene remained completely in solution at room temperature and was precipitated from the solution by the addition of approximately 200 parts of isopropyl alcohol. The product was separated from the polymerization liquid, washed with water, and dried to yield a very satisfactory white granular resin.

Example 6

A mixture was prepared consisting of 200 parts of styrene with 200 parts of isoprene and 800 parts of carbon disulfide. This mixture was placed in a jacketed reactor containing liquid ethylene in the jacket, by which the mixture was cooled to a temperature of approximately −103° C. A catalyst consisting of 0.2% of aluminum chloride dissolved in ethyl chloride as in Example 5 was added in the form of a spray as above, approximately 600 parts of catalyst solution being used, the mixture being stirred rapidly and the catalyst applied by a spray nozzle to the surface of the reaction mixture. The reaction proceeded smoothly as in Example 5 to yield a solution of copolymer. This solution also was warmed up to room temperature and the polymer precipitated by the addition of approximately 200 parts of isopropyl alcohol. The resulting copolymer was a tough resinous substance which was distinctly less brittle than the simple polymer of styrene of Example 5.

*Example 7*

A mixture was prepared consisting of approximately 225 parts by volume of styrene with approximately 75 parts by volume of butadiene; together with 900 parts by volume of carbon disulfide. This mixture was placed in the reactor as described in Example 1 and cooled to a temperature of approximately −100° C. To this cooled mixture there was then added approximately 20 parts by volume of catalyst solution, consisting of 0.5% of aluminum chloride in methyl chloride; the catalyst being added over a time interval of approximately 5 minutes. At the end of this time the polymerization was approximately completed, to yield a thick solution of a copolymer of styrene with butadiene, dissolved in the carbon disulfide. This polymer was recovered in the same way and was found to be a highly valuable solid, slightly elastic, modified polystyrene.

The above examples indicate to some extent the scope of this reaction. It is, however, highly valuable for the polymerization of many other substances. A highly valuable interpolymer of isobutylene with butadiene, similar in many ways to that described in Example 1 is readily prepared by a closely similar procedure. Likewise, the procedure is highly valuable for the preparation of copolymers of isobutylene with piperylene, and with dimethyl butadiene, and many other of the substituted butadienes, including such substances as chloroprene, the triolefin known as myrcene; the higher substituted butadienes such as 2-propyl butadiene 1-3 or the 2-butyl butadiene 1-3 or the like. The process is also applicable to the preparation of polymers and copolymers of the non-conjugated diolefins and the various di-iso-propenyl compounds having from 7 to 15 carbon atoms, either alone, or in combination with an iso-olefin such as isobutylene and its homologues, and many other similar compounds which will be obvious to those skilled in the art.

Thus, the present invention provides a new and useful polymerization reaction, by which a high molecular weight olefinic polymer is obtained in solution, thereby avoiding completely all fouling of the reactor with adherent solid polymer, avoiding the necessity of opening the reactor for cleaning out adherent solid polymer, avoiding all question of gumming and stalling of the stirrer, and outstandingly simplifying the procedure for the handling of the polymerization process and reactor. Similarly, the process provides directly a polymer solution which is in a particularly advantageous form for the removal of spent and excess catalyst, thereby greatly reducing subsequent processing of the polymer, and particularly facilitating the separation of other impurities, especially low molecular weight polymers which tend to interfere with the subsequent curing reaction by the production of blisters and sponginess in the cured polymer.

While there are above disclosed but a limited number of embodiments of the invention, it is possible to provide still other embodiments without departing from the inventive concept herein disclosed, and it is therefore desired that only such limitations be imposed upon the appended claims as are stated therein or required by the prior art.

The invention claimed is:

1. In a low temperature polymerization process, the steps, in combination, of chilling carbon-disulfide to a temperature within the range of −10° C. to −150° C., dissolving therein isobutylene in major proportion and, in minor proportion, a conjugated diolefin having a carbon atom content within the range of 4 to 12 inclusive, adding thereto a Friedel-Crafts catalyst and polymerizing the mixed olefins to a dissolved polymer having a molecular weight within the range of 15,000 to 250,000.

2. In a low temperature polymerization process, the steps, in combination, of chilling carbon-disulfide to a temperature within the range of −10° C. to −150° C., dissolving therein isobutylene in major proportion and isoprene in minor proportion, adding thereto a Friedel-Crafts catalyst and polymerizing the mixed olefins to a dissolved polymer having a molecular weight within the range of 15,000 to 250,000.

3. In a low temperature polymerization process, the steps, in combination, of chilling carbon-disulfide to a temperature within the range of −10° C. to −150° C., dissolving therein isobutylene in major proportion and butadiene in minor proportion, adding thereto a Friedel-Crafts catalyst and polymerizing the mixed olefins to a dissolved polymer having a molecular weight within the range of 15,000 to 250,000.

4. In a low temperature polymerization process, the steps, in combination, of chilling carbon-disulfide to a temperature within the range of −10° C. to −150° C., dissolving therein isobutylene in major proportion and piperylene in minor proportion, adding thereto a Friedel-Crafts catalyst and polymerizing the mixed olefins to a dissolved polymer having a molecular weight within the range of 15,000 to 250,000.

5. In a low temperature polymerization process, the steps, in combination, of chilling carbon-disulfide to a temperature within the range of −10° C. to −150° C., dissolving therein isobutylene in major proportion and, in minor proportion, a conjugated diolefin having a carbon atom content within the range of 4 to 12 inclusive, adding thereto a Friedel-Crafts catalyst, thereby polymerizing the mixed olefins to a dissolved polymer having a molecular weight within the range of 15,000 to 250,000, and thereafter removing the catalyst by washing the polymer solution with water.

6. In a low temperature polymerization process, the steps, in combination, of chilling carbon-disulfide to a temperature within the range of −10° C. to −150° C., dissolving therein isobutylene in major proportion, and, in minor proportion, a conjugated diolefin having a carbon atom number within the range of 4 to 12 inclusive, adding thereto a Friedel-Crafts catalyst, thereby polymerizing the mixed olefins to a dissolved polymer having a molecular weight within the range of 15,000 to 250,000, and thereafter removing the catalyst by washing the polymer solution with a hydroxy compound comprising water.

7. In a low temperature polymerization process, the steps, in combination, of chilling carbon-disulfide to a temperature within the range of −10° C. to −150° C., dissolving therein isobutylene in major proportion and, in minor proportion, a conjugated diolefin having a carbon atom number within the range of 4 to 12 inclusive, adding thereto a Friedel-Crafts catalyst, thereby polymerizing the mixed olefins to a dissolved polymer having a molecular weight within the range of 15,000 to 250,000, and thereafter volatilizing out the solvent to recover the solid polymer.

8. In a low temperature polymerization process, the steps in combination, of chilling carbon-disulfide to a temperature within the range of −10° C. to −150 C., dissolving therein isobutylene in major proportion, and, in minor proportion, a conjugated diolefin having a carbon atom number within the range of 4 to 12 inclusive, adding thereto a Friedel-Crafts catalyst, thereby polymerizing the mixed olefins to a dissolved polymer having a molecular weight within the range of 15,000 to 250,000, and precipitating the solid polymer from the solution by applications thereto of an organic diluent which is a non-solvent for the polymer, in successive fractional steps to recover separately various molecular weight polymers.

9. In a low temperature polymerization process, the steps, in combination, of mixing isobutylene, a polyolefin having from 4 to 12 carbon atoms per molecule comprising butadiene, and carbon disulfide, and polymerizing the mixture at a temperature of between −10° C. and −150° C. by the application thereto of a Friedel-Crafts catalyst in solution in an organic solvent which forms no complex with the Friedel-Crafts catalyst and is liquid at the reaction temperature, to yield a polymer solution in which the polymer has a molecular weight above 15,000.

10. In a low temperature polymerization process, the steps, in combination, of mixing isobutylene, a polyolefin having from 4 to 12 carbon atoms per molecule comprising isoprene, and carbon disulfide, and polymerizing the mixture at a temperature of between −10° C. and −150° C. by the application thereto of a Friedel-Crafts catalyst in solution in an organic solvent which forms no complex with the Friedel-Crafts catalyst and is liquid at the reaction temperature, to yield a polymer solution in which the polymer has a molecular weight above 15,000.

11. In a low temperature polymerization process, the steps, in combination, of mixing isobutylene, a polyolefin having from 4 to 12 carbon atoms per molecule comprising dimethyl butadiene, and carbon disulfide, and polymerizing the mixture at a temperature of between −10° C. and −150° C. by the application thereto of a Friedel-Crafts catalyst in solution in an organic solvent which forms no complex with the Friedel-Crafts catalyst and is liquid at the reaction temperature, to yield a polymer solution in which the polymer has a molecular weight above 15,000.

JOSEPH F. NELSON
AUGUSTUS B. SMALL.